Oct. 29, 1929.  J. R. HERBERT  1,733,963
ANTISKID DEVICE
Filed Aug. 30. 1926
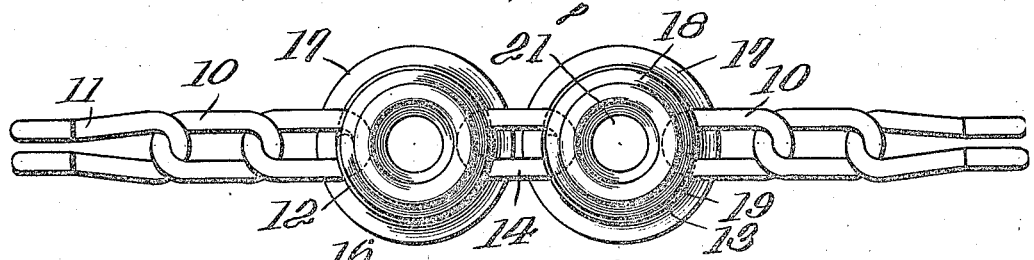
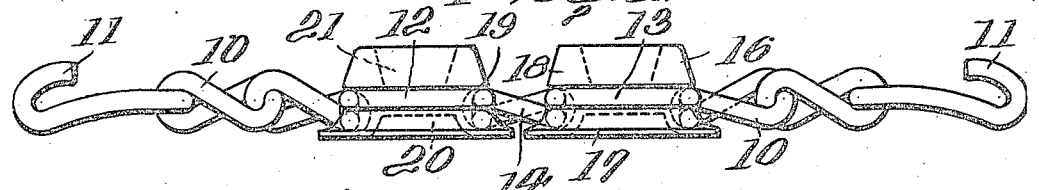
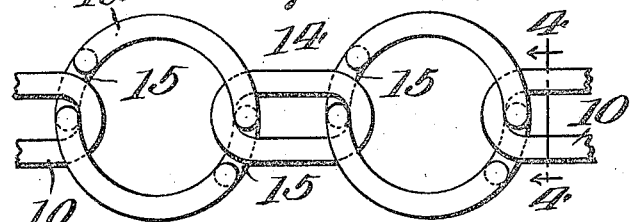
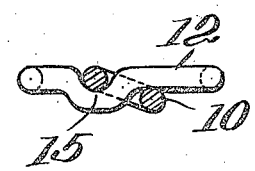
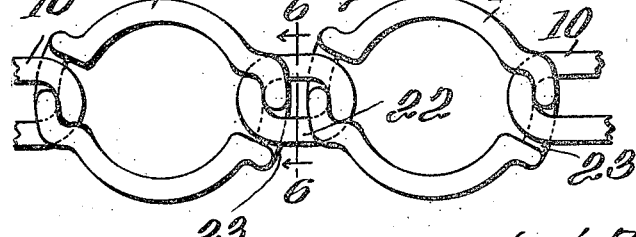
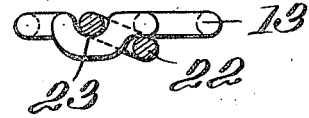
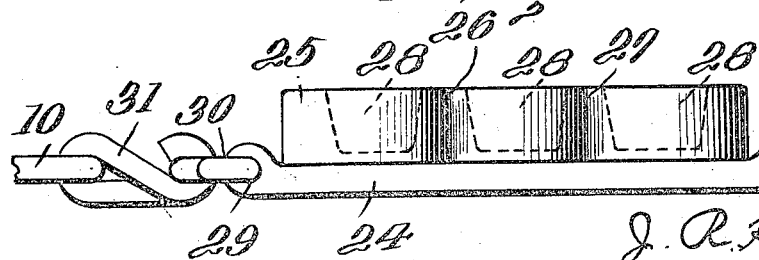

Patented Oct. 29, 1929

1,733,963

UNITED STATES PATENT OFFICE

JOHN ROY HERBERT, OF KITTANNING, PENNSYLVANIA

ANTISKID DEVICE

Application filed August 30, 1926. Serial No. 132,576.

This invention relates to improvements in anti-skid devices, being directed more particularly to a non-skid automobile tire cross chain in which the road engaging elements comprise vacuum cup disks composed preferably of rubber.

The primary object of the invention is to provide a tire cross chain which can be substituted in place of the common form of cross chain now in use and which will extend the life of the chain and at the same time provide a chain which is more quiet when in use and by reason of its construction be more efficient in preventing skidding.

A still further object of the invention is the provision of an anti-skid device which will be less likely to injure or damage the automobile tire than those forms of chains now in use.

A still further object of the invention is the provision of a highly efficient non-skid tire chain which will outlast those chains now in common use, and at the same time not sacrifice in any manner the strength of the chain.

A still further object of the invention is to provide an anti-skid chain which is cheap and simple to manufacture.

Other and further objects and novel features of the construction and improved results of the invention will appear from the following description and accompanying drawings.

In the drawings:

Figure 1 is a top plan view of a chain built in accordance with the invention.

Figure 2 is a view in side elevation of the improved chain.

Figure 3 is a plan view of the cross chain showing the disc retainers, the discs themselves having been removed.

Figure 4 is a detail sectional view taken on the line 4—4 of Figure 3, looking in the direction indicated by the arrow.

Figure 5 is a plan view of a modified form of disc retaining ring.

Figure 6 is a detail perspective view taken on the line 6—6 of Figure 5.

Figure 7 is a view in side elevation of a modified form of the invention.

In the preferred embodiment of the invention the common form of non-skid cross chain is used and comprises a plurality of links 10, the end links being provided with hooked links 11 which are adapted for connection with the circular chain which ordinarily extends around both the outer and inner sides of the tire.

To adapt the common form of cross chain to my invention a number of the links are removed and in their place are substituted two disk retaining rings 12 and 13 spaced apart, having connection one with the other by reason of a link 14. The disk retaining rings are circular in shape and are provided at opposite sides with depressed portions 15 which are adapted to receive the ends of the links 10 and 14 in such a manner that their upper edges extend only to the peripheral upper edge of the rings.

The disks are preferably made of rubber, although some other suitable material such as fabric, could be substituted, being designated at 16. These disks have an outwardly flared bottom portion 17, while their tops are tapered slightly inward as at 18. Approximately midway the depth of the disks they are provided with a circumferential groove 19 in which the retaining ring 13 is adapted to seat.

By reason of the disk being made of rubber, it will be clearly understood that when the disks are compressed and forced into the retaining rings until the rings 13 have seated themselves in the groove, that the disks will be positively retained in place.

The lower ends of the disks are provided with a depression or vacuum cup 20 which engages the tire tread and has a tendency to prevent the chain from creeping while the upper ends of the disk are provided with a much deeper depression or vacuum cup 21. By reason of the vacuum cup 21, it will be readily seen that a very efficient gripping of the road is had and that the operation of the chains will be noiseless.

It has been found that the life of a chain made in accordance with this invention is much greater than that of the ordinary metal cross chain, and has the further advantage that as the rubber disks become worn, they can be removed and new ones substituted in their place.

It is also pointed out that a cross chain made in accordance with this invention can be substituted for the cross chains of an ordinary non-skid metal tire cross chain as the ordinary chains become worn and broken. In this manner a tire chain made in accordance with this invention can be built up from ordinary tire chains by merely substituting in the present invention the cross chains of the ordinary tire chains as they become worthless and broken in use.

In Figures 5 and 6 of the drawing a modified form of disk retaining ring is illustrated, the disk retaining rings 12 and 13 in this instance being connected with a much shorter link 22. At opposite sides the rings are provided with depressed portions 23 which are offset outwardly beyond the plane of the peripheral edge of the ring and by reason of this construction the inner ends of the chain links 10 and 22 lie in the same plane as the inner circumferential edge of the retaining rings. It has been found that these, the road engaging disks can be much more easily inserted in the rings and consequently more easily removed from the rings.

It will be readily understood that the number of road engaging disks utilized in a single cross chain will depend upon the size of the tire upon which the chain is to be used. Ordinarily two disks have been found sufficient for efficient operation. It will be seen that the entire wear is carried by the rubber disks as the tire will be supported sufficiently above the road bed to prevent any wear upon the links of the cross chain.

In Figure 7 a modified form of the invention appears in which a rubber strap 24 is substituted for the circular rubber disks utilized in the preferred form of the chain. The strap 24 is thickened and provided with three upstanding circular members or disks, 25, 26 and 27, each of which is provided with a circular depression or cup 28 so that the strap has a vacuum cup engagement with the road bed.

When utilizing the modified form of the invention it is necessary to remove from the common cross chain a greater number of links but in all other respects the invention can be used in conjunction with ordinary tire chains in the same manner as the preferred form of the invention. To provide connection with the ordinary links 10 of the cross chain, the strap 24 is provided in its ends with openings 29 carrying a short link 30 for connection with the hook link 31 attached to the ordinary links 10.

A tire chain made in accordance with this invention will cost about double that of the ordinary tire chain but it has been found that whereas the ordinary chain will wear out when run in the neighborhood of one hundred miles on solid roads, the present chain has a life of at least ten times that distance, and additionally has the advantage of providing a more efficient road grip and being much more quiet in operation.

Having thus described my invention, what I desire to claim and secure by Letters Patent is:

1. An anti-skid device comprising a cross chain composed of a plurality of links, a plurality of ring members forming a part of said chain, resilient road engaging members carried by said rings and resiliently retained therein, vacuum pockets in the bottom of said disks for engagement with the tire tread, and vacuum pockets in the outer ends of said disks adapted for engagement with the road bed.

2. An anti-skid device comprising a cross chain made up of a plurality of links, a plurality of rings forming a part of said chain, said rings having depressed portions in their opposite sides adapted to receive the ends of the connecting links, and rubber disks carried within said rings and provided with grooves adapted to receive the rings.

3. A tread link for use with the ordinary form of cross chain of vehicle tire chains comprising a ring having a depressed and laterally offset portion adapted to receive the ends of the links of the cross chain, a resilient disk having a circumferential groove intermediate the ends of the disk and adapted to receive the ring, whereby the disk is removably fastened in said ring by resilient tension.

4. The combination with a vehicle tire, of a chain having a plurality of rings forming a portion of said chain, a plurality of resilient road engaging members having vacuum cups formed in their opposite ends, one end of said road engaging members enlarged and provided thereabove with a circumferential groove adapted to receive the ring, whereby said members are retained in said ring under and by reason of resilient tension.

5. A tread link for vehicle tire cross-chains, comprising a ring having at its opposite edges laterally offset depressed portions adapted to receive the ends of the links forming the cross-chain, said lateral offsets being substantially equal to the thickness of the connecting cross-chain links whereby said links ends lie in the same plane as the inner edge of said ring, and a road-engaging member of resilient material mounted in said ring and maintained therein under and by reason of resilient tension.

In testimony whereof I hereunto affix my signature.

JOHN ROY HERBERT.